June 22, 1954  J. A. DERSCH  2,681,727
TRAY TILTING AND PAN DISCHARGING DEVICE
Filed July 26, 1952

INVENTOR.
John A. Dersch.
BY
Harness, Dickey & Pierce
ATTORNEYS

Patented June 22, 1954

2,681,727

UNITED STATES PATENT OFFICE 2,681,727

TRAY TILTING AND PAN DISCHARGING DEVICE

John A. Dersch, Saginaw, Mich., assignor to Baker-Perkins Inc., Saginaw, Mich., a corporation of New York Application July 26, 1952, Serial No. 301,117

4 Claims. (Cl. 198—155)

This invention relates generally to conveyors for baking ovens and more particularly to an improved tray structure for supporting pans of baked goods, and an improved arrangement for discharging pans from trays after the baking operation.

In applicant's copending application for improvement in Conveyor and Stabilizing Device, Serial No. 236,777, filed July 14, 1951, a novel conveyor for baking ovens was illustrated in which endless conveyor elements extending around pulleys or sprockets were disposed in a baking oven and had trays connected therewith on which pans of baked goods were placed. The pans were conveyed through the oven on superimposed runs of the conveyor and were discharged from the conveyor and oven at the completion of the baking cycle so that the tray from which the pans were discharged was ready to receive more pans filled with goods to be baked. The apparatus of this invention is an improvement over the tray tilting and pan discharging apparatus illustrated in applicant's aforementioned copending application, and is concerned primarily with trays of the type which are tilted rearwardly to discharge the pans of baked goods at a predetermined point along the path of travel of the conveyor. Rearwardly dumping trays have a distinct advantage over trays which dump or discharge from the front or the direction of travel of the conveyor, in that if the pans on the tray are misaligned or their discharge momentarily held up, no jamming or breakage of the mechanism occurs. The trays illustrated in applicant's copending application were of the grid type in which a substantially flat surface on the trays was provided to support the pans of baked goods. No vertically projecting walls or gauges were provided to assure the proper positioning of the pans on the tray, and this construction required the oven operator to be extremely careful in placing the pans on the tray so as not to have the pans overlapping the edges of the trays and so as to maintain the proper spacing of the pans to assure proper baking.

It is an object of this invention to provide a tray having side walls and a back wall which will assure the proper placement of the pans on the tray.

It is a further object of this invention to provide, in an apparatus employing a tray of the aforementioned type, improved means for tilting the tray and discharging the pans therefrom so that the pans may slide freely from the tray without interference from the side or back walls.

It is a still further object of this invention to provide a tray of the aforementioned type, in which the pan supporting grid surface is movable relative to the side and back walls of the tray, with novel means for actuating the pan bottom during the tray tilting operation to bring the pan bottom at the back at least level with the upper edge of the back wall so that the pans may slide freey from the tray onto a transverse conveyor or other mechanism for delivery away from the oven.

It is a still further object of this invention to provide in apparatus of the aforementioned type, means for adjusting the position of the pan supporting grid surface to maintain the same horizontal at all times and maintain the elements of the tray in the proper relationship relative to each other.

It is a still further object of this invention to provide in a conveyor apparatus of the aforementioned type, an improved mechanism for supporting the tray on the conveyor mechanism and tilting the same so as to discharge the pans in a simple, positive manner, without danger of breakage or damage due to the jamming of the pans.

These and other objects of this invention will become apparent from the following detailed description, taken in conjunction with the accompanying drawings, in which.

Figure 1:
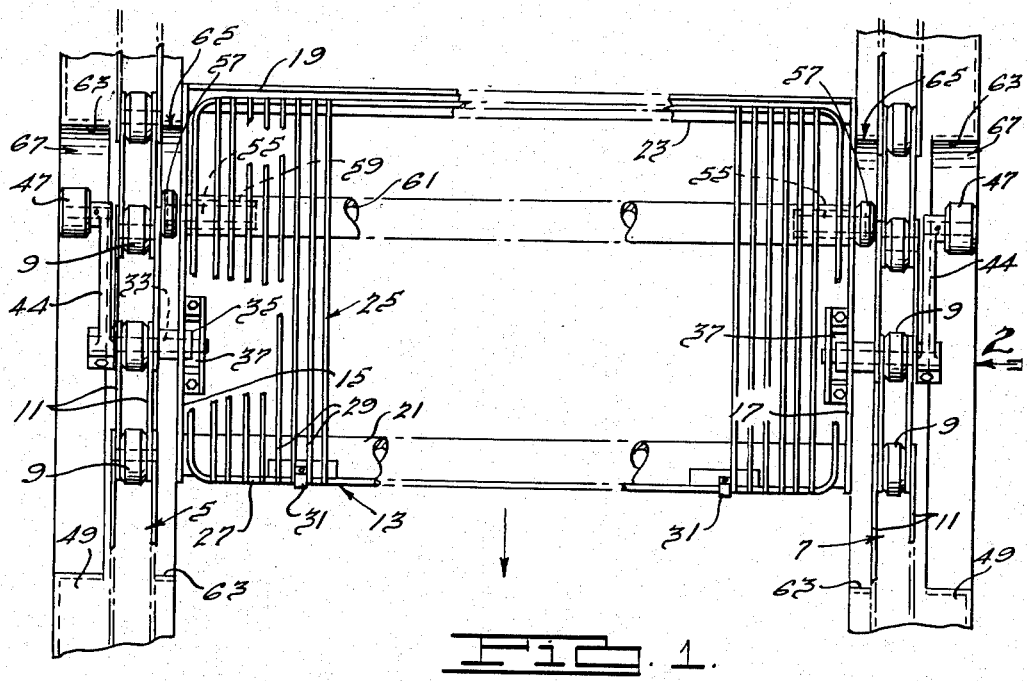
Figure 1 is a fragmentary top plan view of a portion of the conveyor apparatus of this invention illustrating one tray and its actuating mechanism connected with the conveyor.

Referring now to the drawing, a pair of laterally spaced endless conveyor chains 5 and 7 are illustrated, which are substantially identical in construction and are adapted to be disposed within a baking oven, in the manner illustrated in applicant's aforementioned copending application. While the conveyor chains 5 and 7 may be of any suitable type, they are illustrated as being of the chain roller type in which rollers 9 are rotatably supported between adjacent conveyor side links 11, in a generally conventional manner. Each of the conveyor chains is of the endless type which extends around chain sprockets (not shown) adjacent the front and back ends of the oven, so as to provide upper and lower horizontal runs. As this invention is directed primarily to the construction of the tray mechanism for supporting pans of goods to be baked, and to the arrangement for discharging the pans from the tray, ony the lower conveyor run and its adjacent structure is illustrated herein.

Extending between the laterally spaced conveyor chains 5 and 7, at points spaced throughout the length of the conveyor, are trays 13. Each tray includes a pair of spaced side bars or wall members 15 and 17, which are rigidly connected at their back ends to a laterally extending back wall forming member 19, which is welded or otherwise suitably secured to the side members 15 and 17. The side members 15 and 17 are rigidly connected by suitable means, at their front lower corners, to a laterally extending front tubular member 21, the top of which is disposed below the side members and the back member. An angle shaped plate or shelf member 23 is connected with the back wall member 19 to provide a supporting surface for the back edge of the tray pan supporting structure or grid 25. The grid 25 consists of a rectangular frame member 27 and a plurality of spaced bars 29, which extend between the front and back frame portions to provide a supporting surface upon which pans of dough are placed for baking. The front edge or portion of the grid 25 is hingedly connected at laterally spaced points to the tubular frame member 21 by hinges 31 so that the grid 25 is hinged to the tray frame at the front and the back portion can pivot upwardly, away from the supporting shelf 23. The trays 13 are moved through the baking oven by the conveyors 5 and 7, and are connected on opposite sides with the conveyors by means of stub shafts 33, which are rotatably supported in bosses 35 connected with the tray side frame members 15 and 17 adjacent the front of the tray. A leveling bar 37 is connected with the inner end of each stub shaft 33 and each leveling bar 37 is provided with horizontally disposed ears 39 at the opposite ends thereof, in which cap screws 41 are threadably carried. Beneath and engageable by the cap screws 41 are angle brackets 43 which are welded or otherwise suitably connected to the tray side frame members. The leveling bars 37 and their associated parts maintain the tray in a proper horizontal position, in a manner which will hereinafter appear.

Each stub shaft 33 extends through its adjacent conveyor side links 11 and roller 9, so as to attach the tray to the conveyor, and the outermost end of the stub shaft 33 has a crank arm 46 rigidly connected therewith by any suitable means, such as by having the outermost end of the stub shaft 33 squared and fitted into a complementary square aperture 45 in the crank arm. Each crank arm extends rearwardly from its stub shaft 33, in a laterally outwardly spaced relationship to the tray, and has a roller 47 rotatably supported on the back end thereof. The roller 47 of each crank arm engages a track 49 disposed therebeneath, so that the trays are supported on the tracks 49 by the chain rollers and the crank arm rollers. By adjusting the cap screws 41 against the brackets 43, the trays can be properly positioned or leveled so as to be maintained in a horizontal relationship relative to the track. The adjustment of set screws 41 therefore assures that the pan supporting surface of each tray will be level and that the crank arm rollers 47 will properly engage the tracks 49.

Each of the tray side frame members 15 and 17, adjacent the back thereof, is formed with a vertically elongated slot 53 therein, through each of which a stub axle 55 projects. Each of the stub axles 55 carries a roller 57 which is disposed in substantial lateral alignment with its adjacent crank arm roller 47 and laterally inwardly of both the crank arm roller 47 and the chain rollers 9. The inner end of each stub shaft 55 is supported in a bushing 59 in one end of a laterally extending tubular member 61, which interconnects the stub shafts and extends below the grid or platform 25. The tubular member 61 terminates at its opposite ends inwardly of the tray side frame members 15 and 17 so as to be disposed below only the grid or platform 25.

Figure 2:
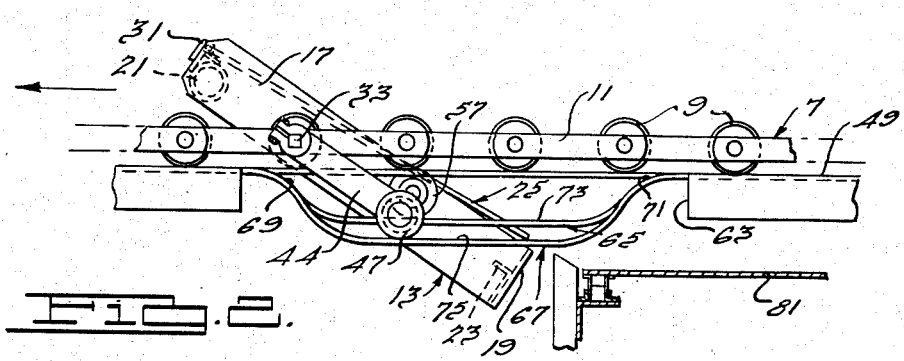
Fig. 2 is a fragmentary end elevational view, partially in section and partially in elevation, of the structure illustrated in Fig. 1, taken in the direction of the arrow 2 thereon, and illustrating the tray in its tilted position.
Figure 3:
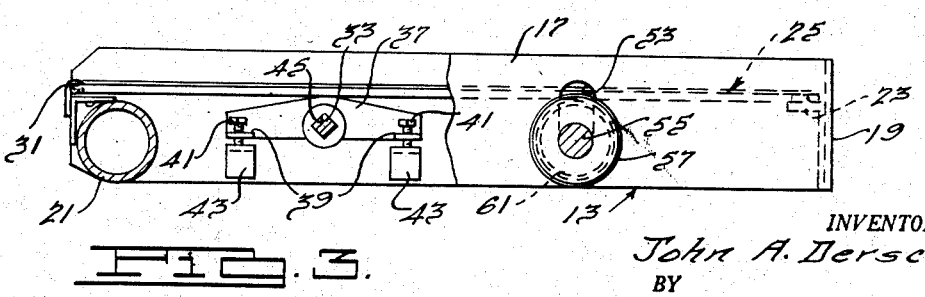
Fig. 3 is a fragmentary end view, partially in section and partially in elevation, of the tray assembly structure in its horizontal untilted position.

The tracks 49 at a predetermined point over the extent thereof, preferably adjacent the conveyor front sprockets, are cut away to provide openings 63 in the path of travel of the crank arm rollers 47 and the stub shaft rollers 57. A cam track 65 is secured to each track in the cut away portion thereof below the stub shaft rollers 57, and a cam track 67 is secured to each track in the cut away portion below the crank arm rollers 47. Each of the cam tracks includes an arcuately inclined front and back portion 69 and 71, respectively, which connect with track 49 adjacent the cut out portions. The cam track 65 is provided with an intermediate horizontal portion 73, which is disposed above an intermediate horizontal portion 75 of the cam track 67. Therefore, when the tray is moved by the conveyor over the cut out portions of the track, the crank arm rollers 47 move down cam track 67 while stub shaft rollers 57 move down cam track 65. When the rollers move down the cam tracks, the entire tray assembly is tilted rearwardly, as illustrated in Fig. 2, but as the horizontal portion 73 of the cam track 65, which the stub shaft rollers 57 engage, is disposed above the horizontal portion 75 of the cam track 67, on which the crank arm rollers 47 roll, the rollers 57 will move the stub shafts 55 and the laterally extending tubular member 61 upwardly relative to the tray frame, which movement will cause the tubular member 61 to engage the under side of the grid or platform 25 and move the back end thereof upwardly about the hinges 31 at the front thereof. The horizontal portions of the cam tracks 65 and 67 are so spaced that the tubular member 61 will move the grid 25 off its supporting shelf 23 to a point at least flush with the upper edge of the tray frame back wall 19, so that any pans thereon may slide freely from the grid, without interference from the back wall, onto a transverse conveyor 81 or any other suitable device which will convey the baked goods in the pans from the conveyor and the oven.

In view of the fact that the tray discharges rearwardly, if the pans are for any reason misaligned or tend to jam, the tray will move away from them and the pans will fall onto the transverse conveyor 81 without any danger of jamming and subsequent damage to the conveyor mechanism.

Still further, by providing the back wall on the tray mechanism, the pans can always be properly positioned on the tray by the oven operator in proper alignment with each other and in the proper position on the tray. Thus, the device of this invention permits the speedy and easy loading of pans onto the tray and the proper and efficient discharging of the pans from the trays after the baking operation has been completed.

What is claimed is:

1. In a conveyor for baking ovens, a pair of spaced conveyor elements, tray means disposed between said conveyor elements and including a rigid frame having a back wall, a platformlike member carried by said frame, means hingedly connecting the front portion of said platformlike member to said frame, means on said frame back wall engaging said platformlike member and normally maintaining the same in a generally horizontal position, a crank arm connected with said frame on each side thereof and pivotally supported on the conveyor element adjacent thereto, each of said crank arms including an end portion spaced from the pivotal axis thereof, stationary track means supported adjacent each conveyor element for engagement by said crank arm ends to maintain said frame in a generally horizontal position, shaft means carried by opposite sides of said frame and movable vertically relative thereto and engageable with said platformlike member for moving the same relative to said frame, rollerlike means carried by said shaft means on opposite sides of said frame and engaging said track means, said rollerlike means being laterally spaced from and in substantial alignment with said crank arm ends, said track means including downwardly offset or depressed portions in the path of travel of said rollerlike means and said crank arm ends respectively, so that said rollerlike means and crank arm ends will move downwardly when passing over said portions to thereby tilt the rear portion of the tray means downwardly, said crank arm end offset track portion being disposed below said rollerlike means offset track portion so that the shaft means below said platformlike member will move upwardly relative to said frame and move the back edge of said platformlike member as high as the top edge of the tray frame back wall, to thereby permit articles carried on said platformlike member to slide rearwardly from said tray means.

2. A tray structure connectable to a conveyor for a baking oven, including a substantially rigid frame having a vertically extending back wall, a platformlike member supported by said rigid frame, means pivotally connecting said platformlike member to said frame along the front edge thereof, an abutment member carried by said frame back wall intermediate the upper and lower edges thereof and engaging the rear portion of said platformlike member to support the same, means carried by said rigid frame engageable with a stationary track to maintain said tray in a substantially horizontal position, and means carried by said frame actuatable to engage said platformlike member and move the back portion thereof upwardly away from said back wall abutment means to bring the back portion of said platformlike member into at least alignment with the upper edge of the frame back wall.

3. In a baking oven conveyor, a pair of laterally spaced conveyor elements, tray means disposed between said conveyor elements and including a rigid frame having a back wall, a platformlike member carried by said frame, means hingedly connecting the front portion of said platformlike member to said frame, abutment means on said frame back wall normally engaging and supporting said platformlike member, stationary track means disposed adjacent each of said conveyor elements, means pivotally connecting opposite sides of said frame to each of said conveyor elements, means connected with said pivot means and engaging said track means to maintain said frame in a desired relationship relative to said track means, means disposed at a predetermined point on each of said track means below the normal level of said track means so that when said track engaging means moves downwardly therealong said tray means will tilt rearwardly about its connection with the conveyor, and means carried by said frame means actuatable upon said tilting movement to cause said platform member to move upwardly relative to said frame so that said platform member will be at least as high as the upper edge of the frame back wall.

4. In a baking oven conveyor, a pair of spaced conveyor elements, tray means disposed between said conveyor elements and including a frame having vertically extending back and side walls, a platformlike member supported on said frame, means hingedly connecting the front portion of said platformlike member to said frame, abutment means on said frame engaging said platformlike member to support the same on said frame, a shaft member journaled on each side of said frame, leveling means connected with each of said shaft members inwardly of its adjacent frame side member, abutment members on each side of said frame adjacent each of said leveling devices, each of said leveling devices including adjustable members engageable with said abutment members for fixing the relative position between said frame and shafts, each of said shaft members being pivotally connected with its adjacent conveyor element, a rearwardly extending arm connected with each of said shaft members laterally outwardly of its adjacent conveyor element, a rollerlike member carried by each arm rearwardly of its shaft member, track means adjacent each of said conveyor elements engaging said arm rollers, a stub shaft carried by each side of said frame rearwardly of said shaft members, said stub shafts being vertically movable relative to said frame, a roller carried by each of said stub shafts and engaging said track means in substantially lateral alignment with said arm rollers, a member extending beneath said platformlike member and interconnecting said stub shafts, said track means having laterally spaced cut out portions therein, said cut out track portions being in alignment with said arm rollers and stub shaft rollers, cam tracks connected with said track means at said cut out portions and including horizontal portions extending below said track means, the horizontal portion of each cam track below an arm roller being disposed below the cam track disposed in alignment with each of said stub shaft rollers so that when said arm rollers move downwardly onto said cam tracks the tray means will be tilted rearwardly but said stub shaft rollers will be disposed above said arm rollers, thereby causing movement of the member interconnecting said stub shafts upwardly relative to said frame to move the rear portion of said platformlike member upwardly to a point at least level with the top edge of said frame back wall.

References Cited in the file of this patent

UNITED STATES PATENTS

| Number | Name | Date |
|---|---|---|
| 1,680,441 | Adams | Aug. 14, 1928 |
| 2,608,287 | Mahoney et al. | Aug. 26, 1952 |